United States Patent
Yasuda et al.

(10) Patent No.: US 7,165,782 B2
(45) Date of Patent: Jan. 23, 2007

(54) AIRBAG APPARATUS FOR AUTOMOBILE

(75) Inventors: Mitsuo Yasuda, Nanto (JP); Atsushi Kaneko, Nanto (JP); Yusuke Ishikuro, Nanto (JP)

(73) Assignee: Sanko Gosei Kabushiki Kaisha, Nanto (JP)

( * ) Notice: Subject to any disclaimer, the term of this patent is extended or adjusted under 35 U.S.C. 154(b) by 107 days.

(21) Appl. No.: 11/044,438

(22) Filed: Jan. 27, 2005

(65) Prior Publication Data
US 2005/0184488 A1    Aug. 25, 2005

(30) Foreign Application Priority Data
Feb. 19, 2004   (JP)   .............................. 2004-043394

(51) Int. Cl.
*B60R 21/20* (2006.01)
(52) U.S. Cl. .............. 280/728.3; 264/400; 219/124.69; 219/124.71
(58) Field of Classification Search ............. 280/728.3, 280/732; 219/121.68–121.71; 264/400
See application file for complete search history.

(56) References Cited

U.S. PATENT DOCUMENTS

| | | | | |
|---|---|---|---|---|
| 5,738,367 A | * | 4/1998 | Zichichi et al. .......... | 280/728.3 |
| 6,337,461 B1 | * | 1/2002 | Yasuda et al. ......... | 219/121.62 |
| 6,453,535 B1 | * | 9/2002 | Nicholas ..................... | 29/413 |
| 7,000,942 B1 | * | 2/2006 | Lutze et al. ............. | 280/728.3 |
| 2001/0010423 A1 | * | 8/2001 | Bauer et al. ............. | 280/728.3 |
| 2004/0207181 A1 | * | 10/2004 | Hayashi et al. .......... | 280/728.3 |
| 2005/0134023 A1 | * | 6/2005 | Cowelchuk et al. ..... | 280/728.3 |

FOREIGN PATENT DOCUMENTS

JP       2003-212075 A    *    7/2003

* cited by examiner

*Primary Examiner*—Ruth Ilan
(74) *Attorney, Agent, or Firm*—Roth & Goldman, P.A.

(57) ABSTRACT

An airbag apparatus utilizes an interior panel of a vehicle. The interior panel has a rectangular fracture-opening section defined by at least one hinge groove and one fracture groove formed on an inside surface of the interior panel through irradiation with laser pulses. The fracture groove includes bridge portions and continuous hole portions provided alternately. Each of the bridge portions includes no laser-formed hole and has a thickness equal to the interior panel. Each of the continuous hole portions is composed of first holes for fracture which have a first depth and are successively formed between adjacent bridge portions through irradiation with laser pulses, and second holes which have a second depth smaller than the first depth and are each formed between adjacent first holes, through irradiation with laser pulses, so as to remove an original-thickness portion between the adjacent first holes.

8 Claims, 9 Drawing Sheets

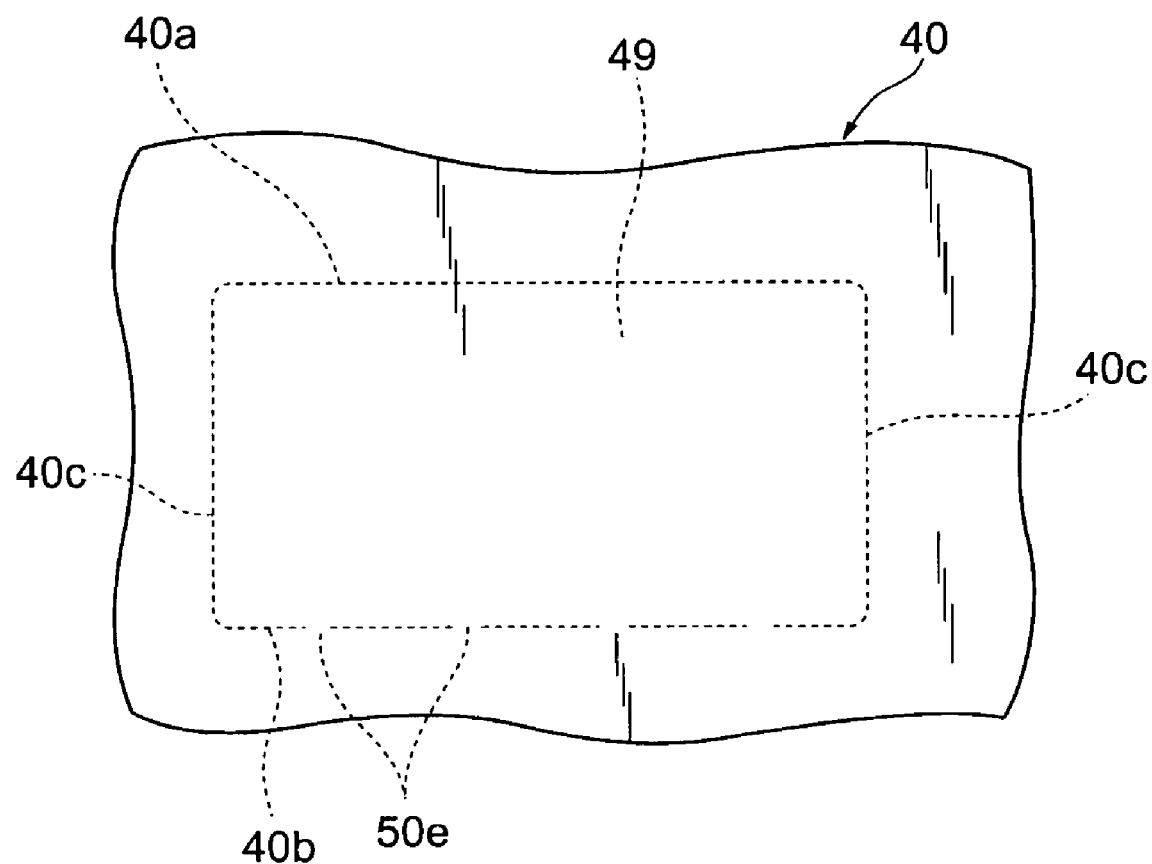

AIRBAG APPARATUS FOR AUTOMOBILE

BACKGROUND OF THE INVENTION

1. Field of the Invention

The present invention relates to an airbag apparatus for an automobile for protecting a person in an automobile such as a car; for example, a driver or a passenger sitting in the front passenger seat, from impact upon head-on or side collision of the automobile to thereby ensure safety of the person. More particularly, the invention relates to an improvement of fracture grooves of a fracture-opening section.

The term "fracture groove" used in relation to the present invention refers to a weakened portion or a fracture portion for fracture opening which is composed of successive holes formed on the reverse or inside surface of an interior panel of an automobile through irradiation with laser pulses generated from laser generation means in the form of laser pluses.

2. Description of the Related Art

An airbag apparatus for a front passenger seat or a driver's seat of an automobile, such as a car, or that to be mounted on a side pillar of the automobile basically includes an airbag, an airbag case for accommodating the folded airbag, and an inflater for inflating the airbag. The airbag apparatus is disposed behind an interior panel of the automobile.

In general, an interior member of an automobile is composed of a panel core formed integrally from a plastic resin material, such as polypropylene, and an instrument panel (hereinafter referred to as an "interior panel"), which is disposed on the surface of the panel core and is composed of a single layer sheet or a multi-layer sheet. The single layer sheet is formed of a plastic resin. The multi-layer sheet is composed of a base layer formed from a plastic resin material, such as polypropylene, an intermediate foam layer, and a surface layer.

Conventionally, a seamless-type airbag apparatus for a front passenger seat has been provided (for example, see Japanese Patent Application Laid-Open (kokai) No. 2001-206180). As shown in FIGS. 1 and 2, the seamless-type airbag apparatus is designed to render fracture grooves 10a, 10b, and 10c of a fracture-opening section 14 invisible.

The airbag apparatus includes an airbag 12, an airbag case 13 for accommodating the airbag 12 in a folded condition, and an inflater (not shown) for inflating the airbag 12. The airbag apparatus is disposed inside an interior panel 10.

Specifically, as shown in FIGS. 1 and 2, the interior panel 10 has a fracture-opening section 14 having a size corresponding to that of an upper opening portion 13a of the airbag case 13. The fracture-opening section 14 is formed through provision of front and rear hinge grooves 10a extending longitudinally (in right-left direction), a center fracture groove 10b extending longitudinally, and side fracture grooves 10c extending transversely (in front-rear direction). These grooves 10a, 10b, and 10c are formed on the inside surface of the interior panel 10 by use of a laser. Specifically, a pulsating laser beam output from an unillustrated laser generation means is radiated perpendicular onto the inside surface of the interior panel 10 while being moved along peripheral edges of a pair of reinforcement plate members 11 fixed to the inside surface, thereby forming the grooves 10a, 10b, and 10c.

The longitudinally extending center fracture groove 10b divides the fracture-opening section 14 into a front fracture-opening subsection 15a and a rear fracture-opening subsection 15b. Upon inflation of the airbag, the fracture-opening subsections 15a and 15b are split apart from each other in a casement condition (in opposite directions) while hinging on the front and rear hinge grooves 10a.

When, upon inflation of the airbag, the fracture-opening section 14 of the interior panel 10 is split open by pressure of the inflating airbag 12, the front and rear hinge grooves 10a may be broken, with a resultant separation of the fracture-opening subsections 15a and 15b from the interior panel 10. In order to avoid this problem, the conventional air bag apparatus employs a reinforcing structure including the above-mentioned paired reinforcement plate members 11, which are provided on the inside surface of the fracture-opening section 14 of the interior panel 10. Specifically, a frame-shaped reinforcement rib 16 is formed integrally with the interior panel 10 in such a manner that the rib 16 projects from the inside surface of the interior panel 10, and the rib 16 defines a rectangular space slightly larger than the opening portion 13a of the airbag case 13. The paired reinforcement plate members 11 are disposed within the rectangular space defined by the rib 16. The horizontal portions 11a of the reinforcement plate members 11 are fixedly attached to the inside surface of the fracture-opening section 14 through thermal joining or like processing. Vertical portions 11b of the reinforcement plate members 11 are bent at their hinge portions 11c and extend downward along the inner surfaces of front and rear walls of the reinforcement rib 16. Openings 11d and 16a are formed in the front and rear walls of the reinforcement rib 16 and the corresponding vertical portions 11b of the reinforcement plate members 11, respectively. Hooks 17 attached to front and rear walls 13b of the airbag case 13 are engaged with the corresponding openings 11d and 16a. This structure prevents scattering of the fracture-opening subsections 15a and 15b of the fracture-opening section 14 of the interior panel 10 upon inflation of the airbag.

The thus-configured airbag apparatus functions in the following manner. Upon collision of the automobile, an impact force caused by the collision is detected by a sensor. A control unit including a CPU judges whether or not the detected impact force is equal to or greater than a predetermined value. When the control unit judges that the impact force is equal to or greater than the predetermined value, the control unit issues a signal for causing the inflater to generate a predetermined gas. The gas is fed to the airbag so as to promptly inflate the airbag.

The inflating airbag presses, from inside, the fracture-opening section 14 of the interior panel 10. The fracture-opening section 14 is fractured along the center fracture groove 10b and the side fracture grooves 10c, whereby the fracture-opening subsections 15a and 15b are split open about the front and rear hinge grooves 10a. The thus-opened front and rear fracture-opening subsections 15a and 15b are further opened while being turned inside out about the hinge portions 11c of the reinforcement plate members 11.

Simultaneously, the inflating airbag 12 projects outward from the interior panel 10 through the thus-opened fracture-opening section 14. Serving as a cushion, the inflated airbag 12 supports a front seat passenger at his/her chest and head, thereby protecting the passenger from the impact force of collision.

As described above, in the conventional seamless-type airbag apparatus, hinge grooves and fracture grooves of the fracture-opening section are formed by use of a pulsating laser beam generated from a laser generation means. Specifically, the front and back hinge grooves 10a, the center fracture groove 10b, and the side fracture grooves 10c are formed on the inside surface of the interior panel 10 through an operation of radiating a pulsating laser beam onto the inside surface of the interior panel 10 while moving the laser beam along peripheral edges of the pair of reinforcement plate members 11.

Therefore, in the case where an instrument panel is formed of a single-layer sheet, the following problem arises. Since the holes which constitute each groove are formed through irradiation with laser pulses having a predetermined pulse width, portions having the original thickness remain between adjacent holes and make the fracture-opening portion difficult to fracture. As a result, the remaining original-thickness portions form uneven fractured portions on the opening fracture surface when the fracture-opening portion fractures, and depressions and/or machining marks are formed on the surface of the interior panel, whereby the appearance of the interior panel is impaired.

Therefore, in the conventional technique, in order to make the opening fracture surface uniform, in a process of forming holes which constitute a fracture groove, holes for fracture which have a depth for reaching the outer surface of the interior panel are formed so as to facilitate the fracturing of the fracture groove.

As a result, the center fracture groove 10b of the fracture-opening section 14 of the interior panel 10 becomes weak against pressing force from above, a center portion or peripheral edge portion of the fracture-opening section 14 subsides or deforms, whereby sheering stress acts on the interior panel 10 at the time of expansion and deployment of the airbag, and burrs or the like are produced at the peripheral edge portion of the fracture-opening section 14.

Moreover, in the conventional airbag apparatus, a reinforcement plate member is disposed on the inner surface of the fracture-opening section 14 so as to impart the interior panel a resistance to pressing force from the upper side of the interior panel, to thereby prevent damages to the peripheral edge portion of the opening of the interior panel, the opening being formed upon fracture opening of the fracture-opening section.

SUMMARY OF THE INVENTION

In view of the foregoing, an object of the present invention is to provide an airbag apparatus for an automobile which has improved resistance to pressing force applied to a fracture-groove formed portion of the fracture-opening section of an interior panel from a surface side, and improved appearance, and which enables smooth opening of the fracture-opening section to thereby prevent damage to an opening formed through fracture opening of the fracture-opening section.

To achieve the above object, the present invention provides an airbag apparatus for an automobile, comprising an airbag disposed in a folded condition behind an interior panel at a predetermined position, the interior panel having a generally rectangular fracture-opening section at a position corresponding to that of the airbag, the fracture-opening section being defined by at least one hinge groove and one fracture groove generally parallel to the hinge groove, the hinge groove and fracture groove being formed on an inside surface of the interior panel through irradiation with laser pulses, the fracture-opening section being opened toward two opposite directions or a single direction when the airbag is expanded and deployed. The fracture groove includes bridge portions and continuous hole portions provided alternately, each of the bridge portions including no laser-formed hole and having a thickness equal to the interior panel, each of the continuous hole portions being composed of first holes for fracture which have a first depth and are successively formed between adjacent bridge portions through irradiation with laser pulses, and second holes which have a second depth smaller than the first depth and are each formed between adjacent first holes, through irradiation with laser pulses, so as to remove an original-thickness portion between the adjacent first holes.

The above-described configuration improves the resistance to pressing force which is applied to a fracture-groove formed portion of the fracture-opening section of an interior panel from a surface side, and improves the appearance. In addition, the above-described configuration enables smooth opening of the fracture-opening section to thereby prevent damage to an opening formed through fracture open of the fracture-opening section.

In particular, the above-described configuration improves the resistance to pressing force which is applied to the fracture groove forming portion of the fracture-opening section, while maintaining the function of the fracture weakened portion. Therefore, it is possible to eliminate a reinforcement member, such as a reinforcement plate member disposed on the reverse surface of the fracture-opening section, which has been conventionally required, to thereby simplify assembly work and reduce production cost.

Preferably, each of the interior panel and the reinforcement frame member is formed of a thermoplastic orefinic elastomer (TPO). In this case, since the interior panel and the reinforcement frame member have flexibility, no flinders are scattered even when the fracture-opening section is fracture-opened upon deployment of the airbag, whereby safety of a passenger is ensured.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 11 is a plan view showing the fracture-opening section of the interior panel of FIG. 10.

DESCRIPTION OF THE PREFERRED EMBODIMENTS

The airbag apparatus for an automobile according to the present invention is of a type in which hinge grooves and fracture grooves are formed at predetermined positions on an inner surface of an interior panel through irradiation with laser pulses, to thereby form a fracture-opening section, which is opened in a casement condition or in a single direction upon expansion of an airbag. Embodiments of the present invention in which a fracture-opening section is provided on the front passenger seat side of an interior panel will next be described with reference to the drawings.

Figure 7A:
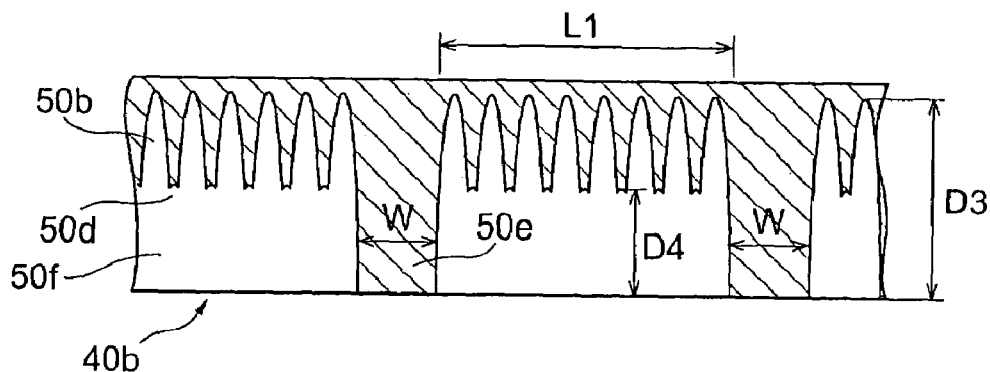
FIG. 7A is an enlarged partial cross section taken along lines 7A—7A of FIG. 5.
Figure 7B:
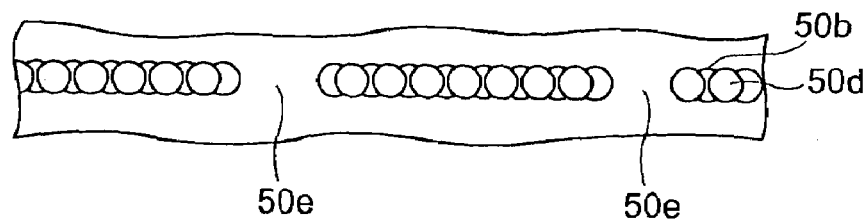
FIG. 7B is a bottom view showing end portions of holes successively formed on the inside surface of the interior panel through continuous irradiation with laser pulses.
Figure 8A:
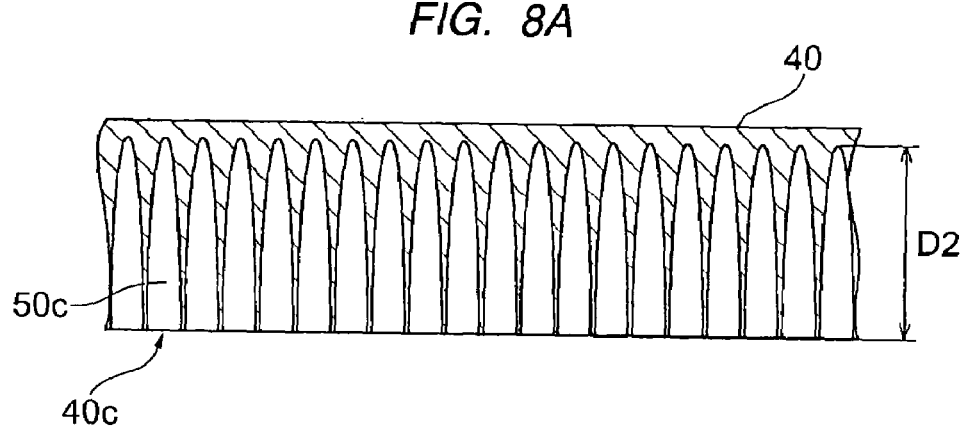
FIG. 8A is an enlarged partial cross section taken along lines 8A—8A of FIG. 5.
Figure 8B:
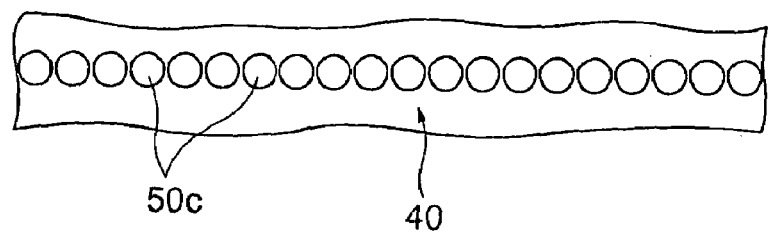
FIG. 8B is a bottom view showing end portions of holes successively formed on the inside surface of the interior panel through continuous irradiation with laser pulses.
Figure 9A:
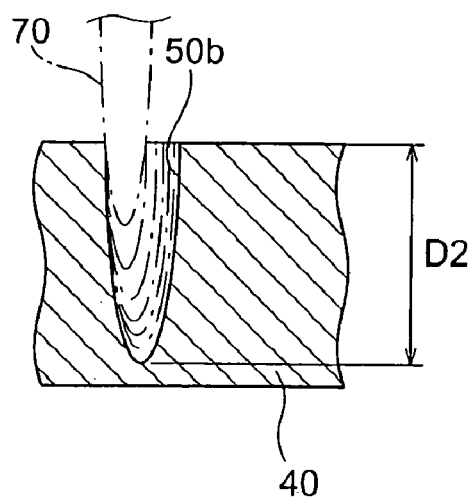
FIG. 9A to 9C are schematic cross sections showing the steps of a process of forming holes which constitute a fracture groove, through irradiation with laser pulses.
Figure 9B:
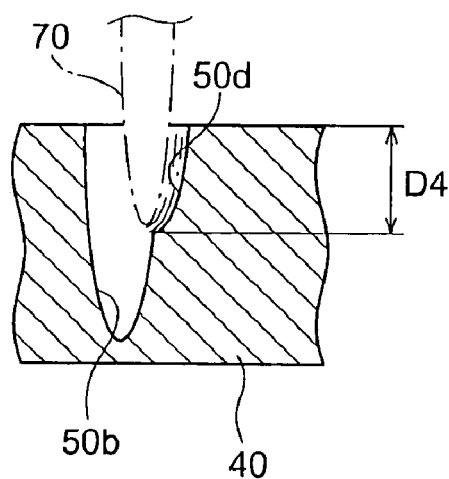
Figure 9C:
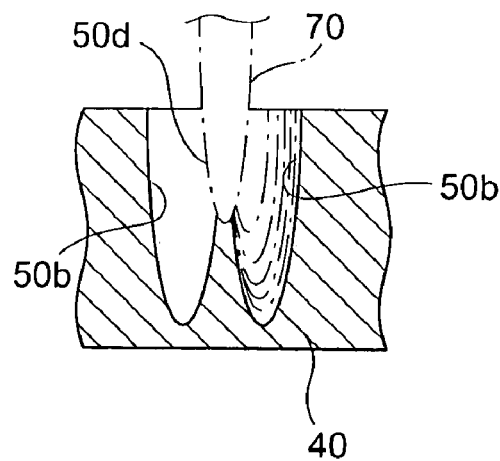

First Embodiment:

FIGS. 3–8B show an airbag apparatus for an automobile according to a first embodiment of the present invention; and FIGS. 9A–9C show a process of forming holes which constitute a fracture groove, through irradiation with laser pulses.

Figure 1:
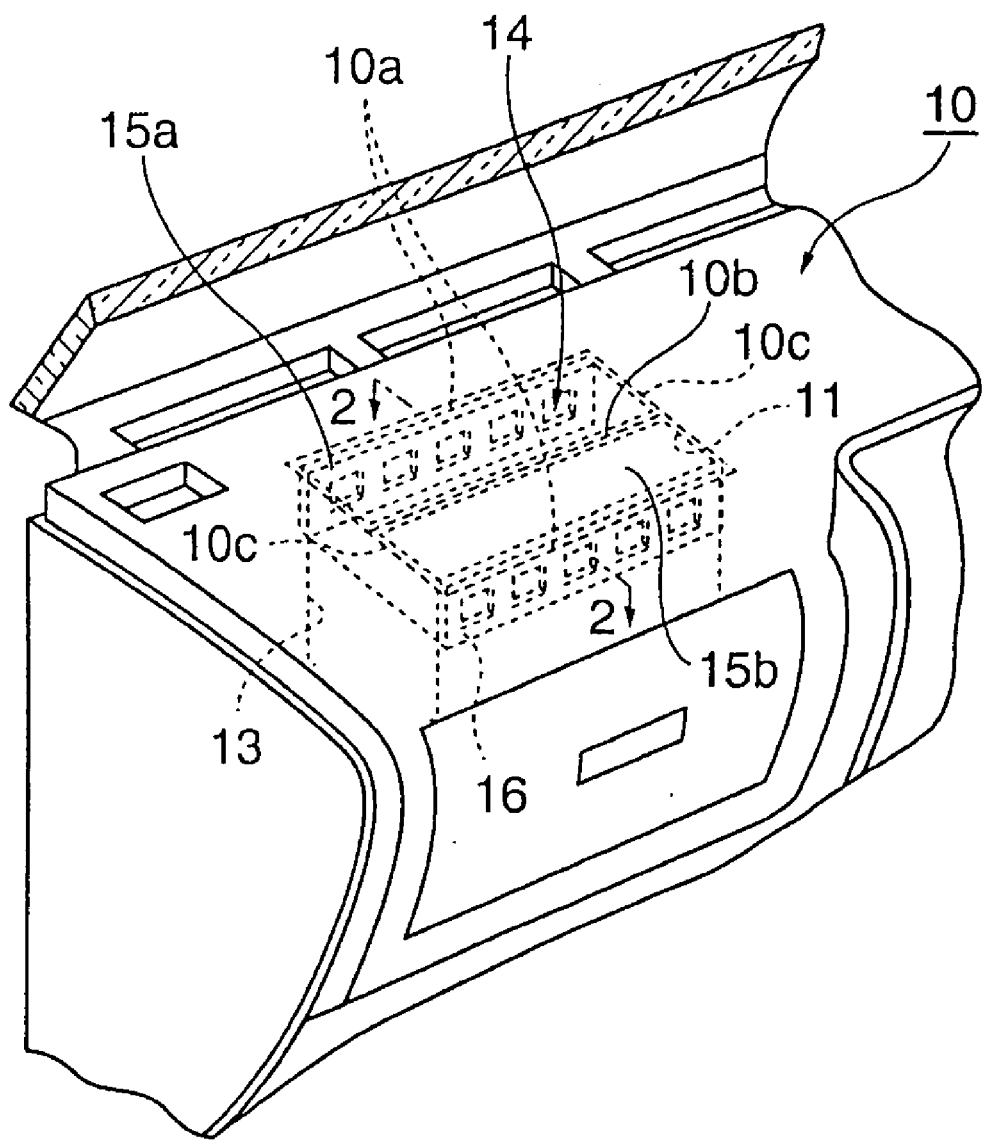
FIG. 1 is a schematic perspective view of a conventional airbag apparatus for a front passenger seat, showing an interior panel composed of a single layer sheet and having a fracture-opening section for allowing an inflating airbag to project outward therethrough.
Figure 2:
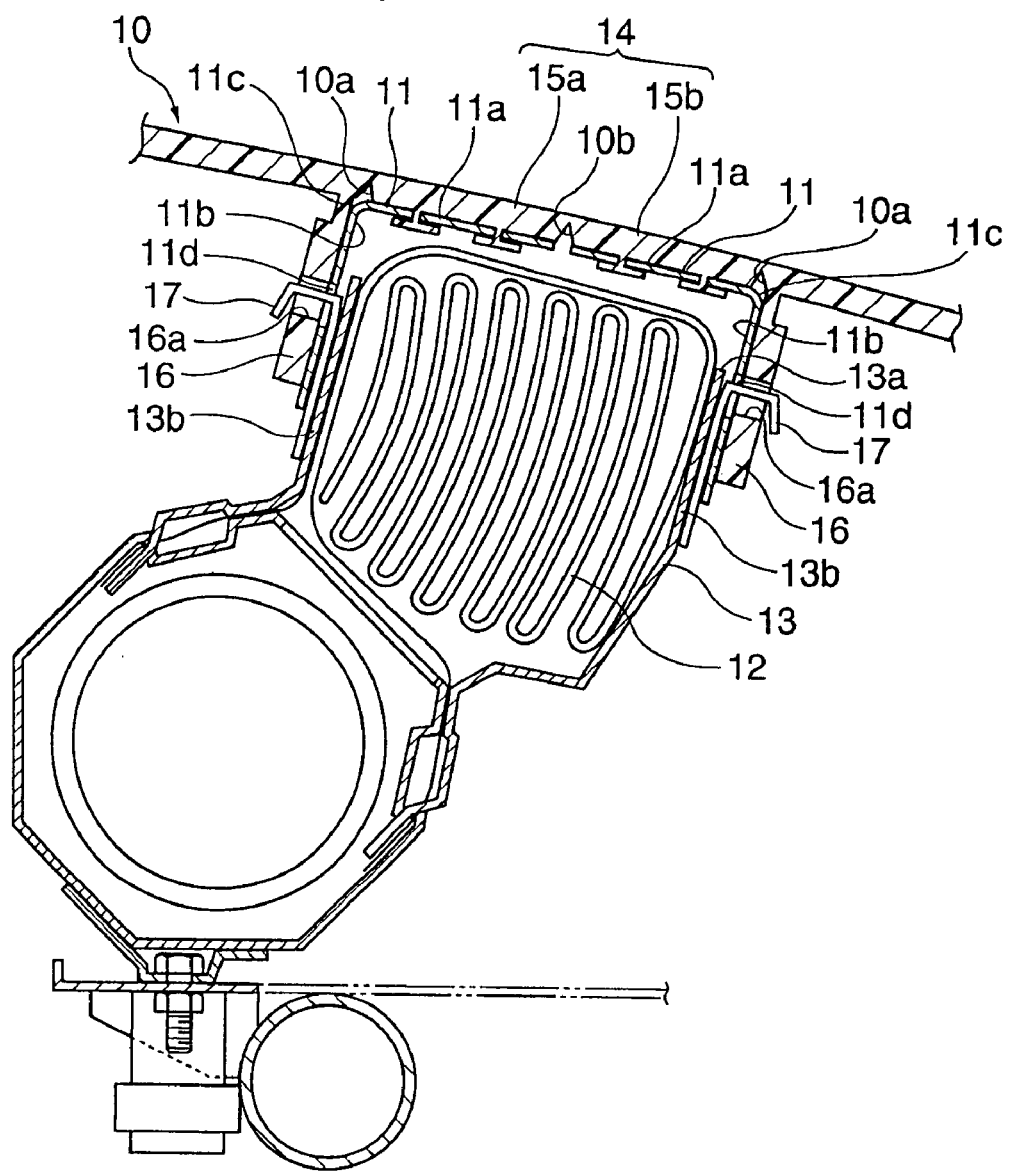
FIG. 2 is a schematic sectional view taken along line 2—2 of FIG. 1.
Figure 3:
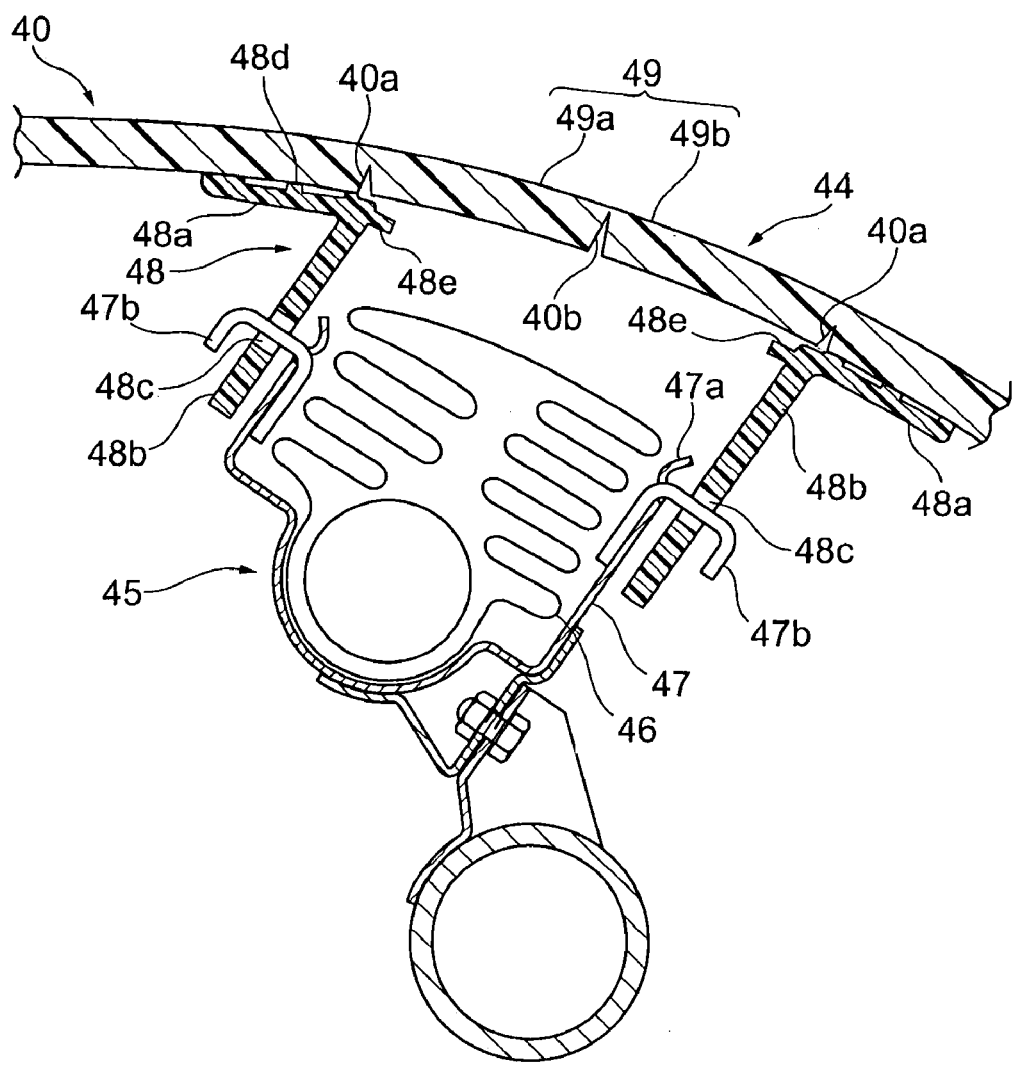
FIG. 3 is a vertical sectional view of a main portion of an airbag apparatus for an automobile according to a first embodiment of the present invention and applied to use with a front passenger seat.
Figure 4:
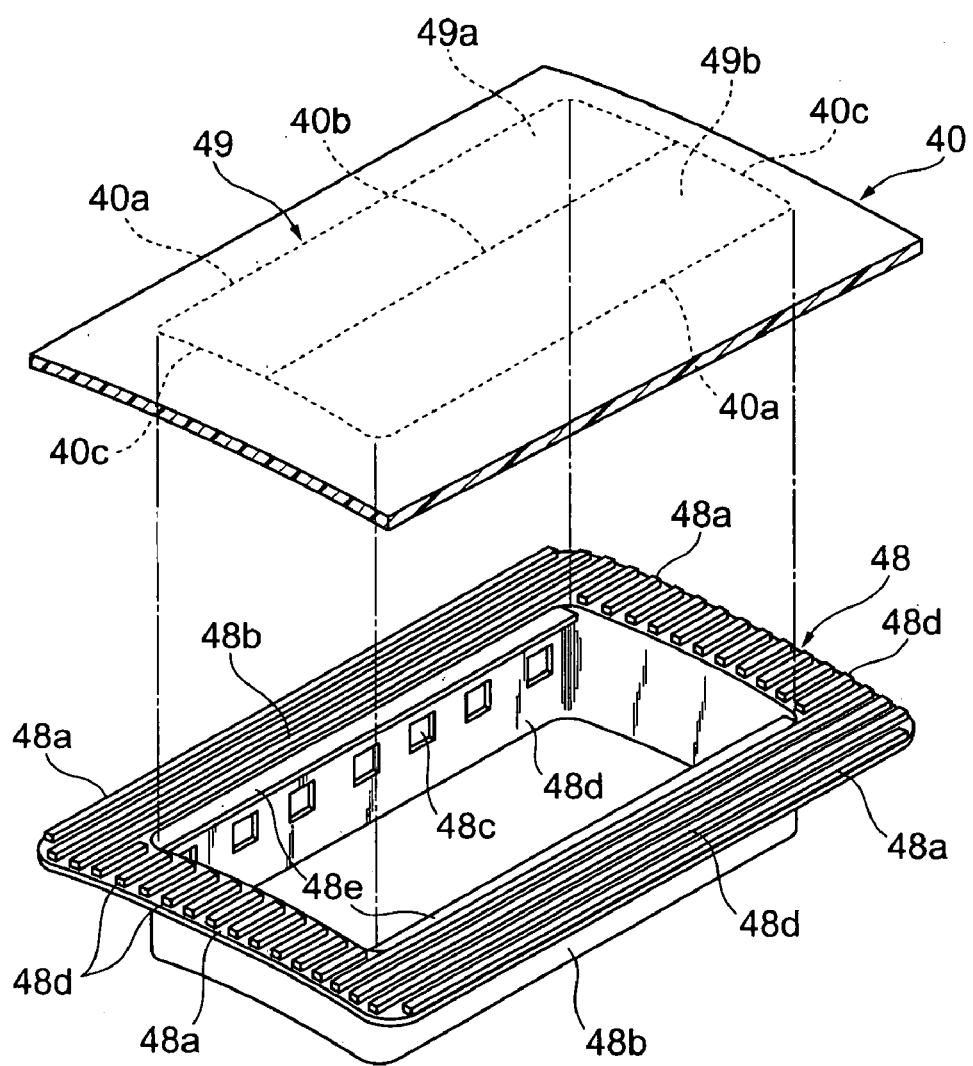
FIG. 4 is a perspective view of the reinforcement frame member to be attached to the fracture-opening section of the interior panel.

In FIG. 3, reference numeral 40 denotes a resin interior panel formed mainly of a thermoplastic orefinic elastomer (TPO). The interior panel 40 covers an instrument panel core (not shown) formed of a resin and fixed to an unillustrated car body, and is fixedly attached to the instrument panel core by use of appropriate means, such as tapping screws.

As shown in FIG. 3, an accommodation section 45 for accommodating an airbag apparatus for an automobile 44 is formed behind a left-hand portion (for a right-hand-drive automobile) of the interior panel 40 in opposition to a front passenger seat. A left-hand-drive automobile employs a mirror image of the configuration of the present embodiment; i.e., the accommodation section 45 is formed behind a right-hand portion of the interior panel 40.

The airbag apparatus for an automobile 44 includes an airbag 46 to be inflated by means of gas from an inflater; an airbag case 47 which accommodates the airbag 46 in a folded condition and which has an opening section 47a at its upper end; and a reinforcement frame member 48 which is formed of a thermoplastic orefinic elastomer (TPO) similar to that of the interior panel 40 and which has a reinforcement edge portion 48a for reinforcing a portion of the interior panel 40 surrounding a fracture-opening section 49. Rectangular holes 48c are formed in side walls 48b of the reinforcement frame member 48. A plurality of hooks 47b are fixed at their proximal ends to front and rear walls of the airbag case 47 at intervals corresponding to those of the rectangular holes 48c; and the distal ends of the hooks 47b are engaged with the rectangular holes 48c.

Further, welding burr prevention flanges 48e are formed at the upper opening of the reinforcement frame member 48 to correspond to hinge grooves 40a to be described later. The welding burr prevention flanges 48e project slightly inward of the opening.

Figure 5:
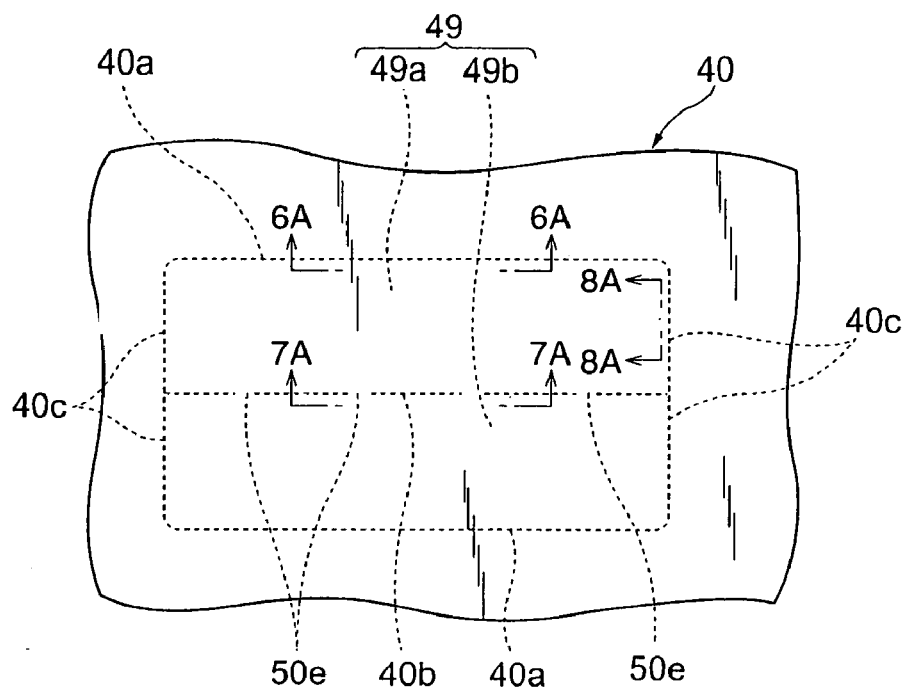
FIG. 5 is a plan view of the fracture-opening section of the interior panel.

As shown in FIG. 5, the fracture-opening section 49 of the interior panel 40 has front and rear hinge grooves 40a formed at front and rear edges, respectively, of the fracture-opening section 49; left and right fracture grooves 40c formed at left and right edges, respectively, of the fracture-opening section 49; and a center fracture groove 40b, which is formed in parallel to the hinge grooves 40a. The hinge grooves 40a and the fracture grooves 40c define the shape of a rectangular opening on the inside surface of the interior panel 40 facing the opening 47a of the airbag case 47, the opening allowing deployment of the airbag. The center fracture groove 40b divides the fracture-opening section 49 into front and rear fracture-opening subsections 49a and 49b. When the airbag 46 is deployed, the fracture-opening subsections 49a and 49b are turned inside out, in opposite directions, about the hinge grooves 40a.

As shown in FIGS. 6A to 8B, the fracture grooves 40b and 40c and the hinge grooves 40a are formed of a plurality of sets of holes which are formed on the inside surface of the interior panel 40 through irradiation with laser pulses and which have different depths.

Figure 6A:
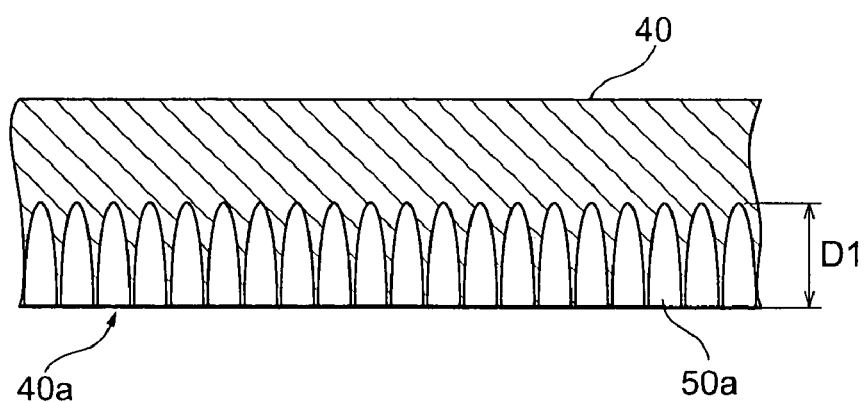
FIG. 6A is an enlarged partial cross section taken along lines 6A—6A of FIG. 5.
Figure 6B:
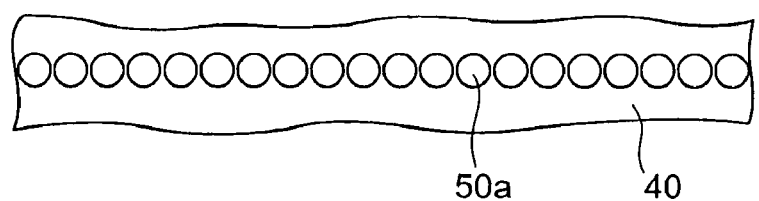
FIG. 6B is a bottom view showing end portions of holes successively formed on the inside surface of the interior panel through continuous irradiation with laser pulses.

Specifically, as shown in FIGS. 6A and 6B, holes 50a which constitute each of the hinge grooves 40a are successively formed through irradiation with laser pulses having a predetermined pulse width in such a manner that the holes 50a have a depth D1, which is about half the thickness of the interior panel 40. As shown in FIGS. 8A and 8B, holes 50c which constitute each of the left and right fracture grooves 40c are successively formed through irradiation with laser pulses having a predetermined pulse width in such a manner that the holes 50c have a depth D2 greater than D1, and reach a position near the outer surface of the interior panel 40.

As shown in FIGS. 7A and 7B, the center fracture groove 40b is formed in such a manner that bridge portions 50e having no holes for fracture and having a predetermined width W are formed at predetermined intervals L1 through formation of holes 50b and holes 50d. The holes 50b are formed between adjacent bridge portions 50e through irradiation with laser pulses having a predetermined pulse width in such a manner that the holes 50b have a depth D3 for reaching a position near the outer surface of the interior panel 40. The holes 50d are each formed between adjacent holes 50b through irradiation with intermediate short laser pulses having a shortened radiation distance in such a manner that the holes 50d have a depth D4 less than D3. For example, in the case where the fracture groove 40b has a total length of 240 mm and the holes formed by means of laser have a diameter of 0.4 to 0.5 mm, the bridge portions. 50e having a length of 1.00 mm are formed at intervals L1 of 10 to 25 mm through formation of successive holes 50b and formation of a hole 50d between adjacent holes 50b through irradiation with intermediate short laser pulses having a shortened radiation distance. Thus, the original-thickness portion between adjacent holes 50b is removed to thereby form a continuous hole 50f. The machining processes shown in FIGS. 9A to 9C are used for formation of the center fracture groove 40b.

Specifically, as shown in FIG. 9A, a laser beam 70 having a predetermined pulse width and radiation distance is first radiated onto the interior panel 40 from the reverse side thereof in such a manner that a portion corresponding to the center fracture groove 40b is irradiated with the laser beam, whereby a hole 50b having a depth D2 for reaching a position near the outer surface of the interior panel 40 is formed (15 to 20 laser pulses are applied at a moving speed of 30 mm/second by use of a $CO_2$ gas laser (500 W, 5 KHz)).

Subsequently, as shown in FIG. 9B, a laser beam 70 having a shortened radiation distance is radiated onto the interior panel 40 at a position slightly shifted (advanced) from the center of the hole 50b, whereby a hole 50d having a depth D4 is formed (4 to 6 laser pulses are applied at a moving speed of 30 mm/second by use of a $CO_2$ gas laser (500 W, 5 KHz)). Further, as shown in FIG. 9C, a laser beam 70 having the predetermined radiation distance is radiated onto the interior panel 40 at a position slightly shifted (advanced) from the center of the hole 50d, whereby a hole 50b having a depth D2 is formed. These steps are repeated a predetermined number of times.

Elongated projections 48d are formed at predetermined intervals on the surface of the reinforcement edge portion 48a of the reinforcement frame member 48, the surface facing the inside surface of the interior panel 40. The reinforcement edge portion 48a of the reinforcement frame member 48 is fixed to the inner surfaced of the interior panel 40 via the projections 48d by means of vibration welding.

In the present embodiment, the structure of the airbag apparatus is simplified through omission of conventionally used reinforcement plate members which reinforce the fracture-opening section from the reverse side thereof.

In the airbag apparatus of the present embodiment, when an expansion pressure which is generated at the beginning of expansion and deployment of the airbag 46 acts on the inner wall surface of the vertical side wall 48b of the reinforcement frame member 48 and the inside surface of the interior panel 40, weakened portions of the center fracture groove 40b formed of the deep holes 50b start to tear. Subsequently, weakened portions of the left and right fracture grooves 40c formed of the deep holes 50c tear, whereby the fracture-opening section 49 is split into the front and rear fracture-opening subsections 49a and 49b. The fracture-opening subsections 49a and 49b are then turned inside out, in opposite directions, about the hinge grooves 40a formed of the shallow holes 50a. As a result, the airbag 46 having been accommodated in the airbag case 47 in a folded state is deployed outward so as to mitigate the impact acting on a passenger, to thereby secure safety.

In the process of forming the center fracture groove 40b, holes 50b are successively formed through irradiation with laser pulses having a constant pulse width, and then a hole 50d is formed between two adjacent holes 50b through irradiation with an intermediate short laser pulse, in such a manner that bridge portions 50e in which the holes 50b and 50d are not formed are formed at predetermined intervals. Further, the peripheral regions of the fracture-opening section 49 extending parallel to the hinge grooves 40a are reinforced by means of the reinforcement edge portion 48a of the reinforcement frame member 48. These configurations and the flexibility of the material of the interior panel 40 cooperatively impart to the fracture-opening section 49 a resistance to pressing force from the upper side, to thereby prevent cracking, distortion, or other deformation during periods in which the airbag apparatus is not used.

In the present embodiment, since the reinforcement frame member 48 is formed of a thermoplastic orefinic elastomer (TPO) similar to that of the interior panel 40, the reinforcement frame member 48 can be fixed to the interior panel 40 via the elongated projections 48d formed on the reinforcement edge portion 48a of the reinforcement frame member 48, by means of vibration welding. Therefore, the welding work is easy.

Since the airbag case 47 is disengagably engaged with the reinforcement frame member 48, the airbag case 47 can be easily removed from the reinforcement frame member 48 at the time of, for example, disposal of the vehicle. This enables easy separation and removal of the inflator and relevant parts, which become industrial waste, and prevents adverse effects of these parts on the environment.

The thus-configured airbag apparatus according to the first embodiment functions in the following manner. Upon collision of the automobile, an impact force caused by the collision is detected by an unillustrated, known sensor. An unillustrated control unit including a known CPU judges whether or not the detected impact force is at least equal to a predetermined value. When the control unit judges that the impact force is at least equal to the predetermined value, the control unit issues a signal for causing the unillustrated inflater to generate a predetermined gas. The gas is fed to the airbag 46 so as to promptly inflate the airbag 46 to thereby protect the passenger from impact at the time of collision of the vehicle.

Figure 10:
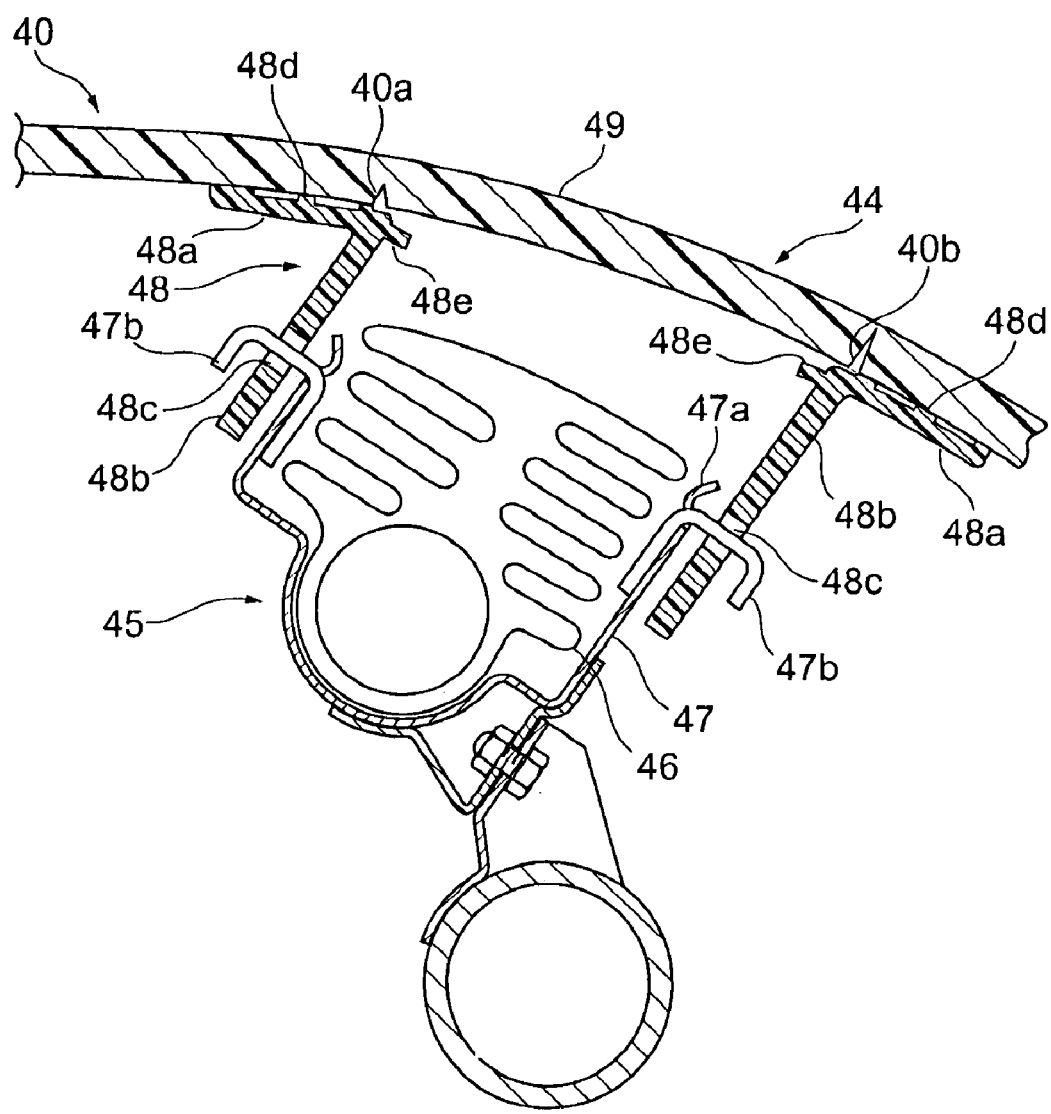
FIG. 10 is a vertical sectional view of an airbag apparatus for an automobile according to a second embodiment of the present invention and applied to use with a front passenger seat in which the fracture-opening section is of a single-direction-open type.

Second Embodiment:

FIG. 10 is a vertical sectional view of an airbag apparatus for an automobile according to a second embodiment of the present invention and applied to use with a front passenger seat in which the fracture-opening section is of a single-direction-open type; and FIG. 11 is a plan view of the fracture-opening section.

The airbag apparatus of the first embodiment is of a casement type (two-direction open type) in which the fracture-opening section 49 is divided into the front and rear fracture-opening subsections 49a and 49b. In contrast, the airbag apparatus of the second embodiment is of a single-direction opening type in which the fracture-opening section 49 does not have the center fracture groove, and one hinge groove 40a on the front passenger seat side is replaced with a fracture groove 40b.

The fracture groove 40b is formed in the same manner as is the center fracture groove in the first embodiment. Specifically, bridge portions 50e having no holes are formed at predetermined intervals L1 through formation of first holes and second holes. The first holes are formed between adjacent bridge portions through irradiation with laser pulses having a predetermined pulse width. The second holes are each formed between adjacent first holes through irradiation with short laser pulses having a shortened irradiation distance to thereby remove the original-thickness portion between the adjacent first holes.

The remaining portions of the second embodiment have the same structure as the first embodiment. Therefore, the corresponding portions are denoted by the same reference numerals, and their repeated descriptions are omitted.

The airbag apparatus of the above-described embodiment does not includes reinforcement plate members which reinforce the fracture-opening section from the reverse side thereof. However, reinforcement plate members may be slidably disposed within the reinforcement frame member as in conventional apparatuses.

Obviously, numerous modifications and variations of the present invention are possible in light of the above teachings. It is therefore to be understood that within the scope of the appended claims, the present invention may be practiced otherwise than as specifically described herein.

What is claimed is:

1. An airbag apparatus for an automobile, comprising an airbag disposed in a folded condition behind an interior panel at a predetermined position, the interior panel having a generally rectangular fracture-opening section at a position corresponding to that of the airbag, the fracture-opening section being defined by at least one hinge groove and one fracture groove generally parallel to the hinge groove, the hinge groove and fracture groove being formed on an inside surface of the interior panel through irradiation with laser pulses, the fracture-opening section being opened toward two opposite directions or a single direction when the airbag is expanded and deployed, wherein the fracture groove includes bridge portions and continuous hole portions provided alternately, each of the bridge portions including no laser-formed hole and having a thickness equal to the interior panel, each of the continuous hole portions being composed of first holes for fracture which have a first depth and are successively formed between adjacent bridge portions through irradiation with laser pulses, and second holes which have a second depth smaller than the first depth and are each formed between adjacent first holes, through irradiation with laser pulses, so as to remove an original-thickness portion between the adjacent first holes.

2. An airbag apparatus for an automobile according to claim 1, wherein the interior panel is formed of a single-layer sheet;

the fracture-opening section is defined by front and rear hinge grooves, a center fracture groove generally parallel to the hinge grooves, and left and right fracture grooves generally perpendicular to the hinge grooves;

when the airbag is expanded and deployed, the fracture-opening section is split at the center fracture groove into front and rear fracture-opening subsections which are opened toward two opposite directions; and the center fracture groove includes bridge portions and continuous hole portions provided alternately, each of the bridge portions including no laser-formed hole and having a thickness equal to the interior panel, each of the continuous hole portions being composed of first holes for fracture which have a first depth and are successively formed between adjacent bridge portions through irradiation with laser pulses, and second holes which have a second depth smaller than the first depth and are each formed between adjacent first holes, through irradiation with laser pulses, so as to remove an original-thickness portion between the adjacent first holes.

3. An airbag apparatus for an automobile according to claim 2, wherein each of the hinge grooves is formed of holes successively formed on the inside surface of the interior panel through irradiation with laser pulses and has a depth about half the thickness of the interior panel; each of the left and right fracture grooves is formed of holes successively formed on the inside surface of the interior panel through irradiation with laser pulses and has a depth for reaching a position near the outer surface of the interior panel, and the first holes of the center fracture groove have a depth for reaching a position near the outer surface of the interior panel.

4. An airbag apparatus for an automobile according to claim 1, wherein the interior panel is formed of a single-layer sheet;

the fracture-opening section is defined by a rear hinge groove, a front fracture groove generally parallel to the hinge groove, and left and right fracture grooves generally perpendicular to the hinge groove and the front fracture groove;

when the airbag is expanded and deployed, the fracture-opening section is fractured and opened toward a single direction; and the front fracture groove includes bridge portions and continuous hole portions provided alternately, each of the bridge portions including no laser-formed hole and having a thickness equal to the interior panel, each of the continuous hole portions being composed of first holes for fracture which have a first depth and are successively formed between adjacent bridge portions through irradiation with laser pulses, and second holes which have a second depth smaller than the first depth and are each formed between adjacent first holes, through irradiation with laser pulses, so as to remove an original-thickness portion between the adjacent first holes.

5. An airbag apparatus for an automobile according to claim 4, wherein the hinge groove is formed of holes successively formed on the inside surface of the interior panel through irradiation with laser pulses and has a depth about half the thickness of the interior panel; each of the left and right fracture grooves is formed of holes successively formed on the inside surface of the interior panel through irradiation with laser pulses and has a depth for reaching a position near the outer surface of the interior panel, and the first holes of the front fracture groove have a depth for reaching a position near the outer surface of the interior panel.

6. An airbag apparatus for an automobile according to claim 1, further comprising a rectangular reinforcement frame member for reinforcing a portion of the interior panel surrounding the fracture-opening section, wherein the reinforcement frame member has a reinforcement edge portion formed around an upper opening thereof, and elongated projections formed on an upper surface of the reinforcement edge portion, whereby the rectangular reinforcement frame member is fixed to the inside surface of the interior panel via the elongated projections by means of vibration welding.

7. An airbag apparatus for an automobile according to claim 6, wherein the reinforcement frame member has an elongated burr prevention flange which is formed at the upper opening thereof and slightly projects toward the center of the opening.

8. An airbag apparatus for an automobile according to claim 6, wherein each of the interior panel and the reinforcement frame member is formed of a thermoplastic orefinic elastomer (TPO).

* * * * *